United States Patent
Doe et al.

(10) Patent No.: US 9,736,215 B1
(45) Date of Patent: *Aug. 15, 2017

(54) SYSTEM AND METHOD FOR CORRELATING END-USER EXPERIENCE DATA AND BACKEND-PERFORMANCE DATA

(71) Applicant: Dell Software Inc., Aliso Viejo, CA (US)

(72) Inventors: Douglas Doe, Toronto (CA); Joseph Rustad, Toronto (CA); Robert A. Dickinson, Boulder, CO (US); Xiangrui Wang, Burlington (CA); Christine Feldmann, Mississauga (CA); Daniel Ivanisevic, Toronto (CA)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/149,750

(22) Filed: May 9, 2016

Related U.S. Application Data (63) Continuation of application No. 13/826,733, filed on Mar. 14, 2013, now Pat. No. 9,338,255.

(51) Int. Cl.
   *G06F 15/16* (2006.01)
   *H04L 29/08* (2006.01)
   *G06F 17/30* (2006.01)

(52) U.S. Cl.
   CPC ........ *H04L 67/02* (2013.01); *G06F 17/30598* (2013.01); *G06F 17/30864* (2013.01)

(58) Field of Classification Search
   CPC ....... H04L 67/14; H04L 67/025; H04L 43/12; H04L 43/08; H04L 43/06; H04L 41/24;
   (Continued)

(56) References Cited

U.S. PATENT DOCUMENTS 7,941,385 B2  5/2011  Pabari et al.
7,979,245 B1  7/2011  Bourlatchkov et al.
(Continued)

OTHER PUBLICATIONS

OPNET Technologies, Inc., "CX-Tracer™ Troubleshoot Applications in Citrix-Hosted Environments", Jan. 25, 2012, 6 pages.
(Continued)

*Primary Examiner* — John B Walsh
(74) *Attorney, Agent, or Firm* — Winstead PC (57) ABSTRACT

In one embodiment, a method includes operating at least one distributed software application. The method further includes receiving a web request from an end-user information handling system in connection with the at least one distributed software application. Further, the method includes generating a transaction identifier for the transaction. Moreover, the method includes processing the transaction. The processing includes generating backend-performance data indexed by the transaction identifier. Additionally, the method includes injecting the transaction identifier into a web response to the web request. Also, the method includes transmitting the web response to the end-user information handling system along a transmission path. In addition, the method includes, at a node along the transmission path, passively observing the response and generating end-user experience data therefrom.

20 Claims, 3 Drawing Sheets

(58) Field of Classification Search
CPC ......... H04L 41/22; H04L 41/20; H04L 41/18; H04L 41/048; H04L 41/046; H04L 41/0266; H04L 41/0253
See application file for complete search history.

(56) References Cited

U.S. PATENT DOCUMENTS

| | | |
|---|---|---|
| 8,175,863 B1 | 5/2012 | Ostermeyer et al. |
| 2006/0064483 A1* | 3/2006 | Patel .................. G06F 11/3419 709/224 |
| 2010/0088404 A1 | 4/2010 | Mani et al. |
| 2012/0278482 A1 | 11/2012 | Alon et al. |

OTHER PUBLICATIONS

Jones, Don, "The Five Essential Elements of Application Performance Monitoring", Realtime Publishers, 2010, 95 pages.
Enterprise Management Associates, "Quest Foglight: Hit the "Easy Button" for No-Fuss Application Performance Monitoring", 2010, 4 pages.
Optier Always-On Business, "OpTier APM", OpTier Ltd, 2012, 20 pages.

* cited by examiner

SYSTEM AND METHOD FOR CORRELATING END-USER EXPERIENCE DATA AND BACKEND-PERFORMANCE DATA

BACKGROUND

Technical Field

The present invention relates generally to performance monitoring and more particularly, but not by way of limitation, to systems and methods for correlating end-user experience data and backend-performance data.

History of Related Art

Information technology (IT) specialists, or system administrators, are responsible for monitoring, maintaining, protecting, and configuring computer systems and their resources. System administrators are often asked to provide access to these resources at practically any time of the day while ensuring the system's integrity is not threatened by dataflow bottlenecks or excessive overhead. To aid administrators in ensuring accessibility and system integrity, many computer systems provide backend-performance data in the form of reports, query-accessible tables, printouts, and the like. An end-user experience may also be measured, for example, by measuring the response time of an application from the perspective of the end user.

Traditionally, end-user experience data and backend-performance data is captured separately at distinct logical or physical nodes in a network architecture. This is because end-user experience data is generally intended to be representative of a web-browsing experience of a user while the backend-performance data is generally intended to be representative of application and/or infrastructure performance from a backend perspective. End-user experience data and backend-performance data is therefore difficult to relate and cross-reference in a meaningful way. While it may be possible to relate end-user experience data to backend-performance data by utilizing context information such as, for example, timestamps, such methods are insufficient and often inaccurate.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on a backend-computing system, operating at least one distributed software application. The backend-computing system comprises at least one web server and at least one application server. The method further includes the at least one web server receiving a web request from an end-user information handling system in connection with the at least one distributed software application. In addition, the method includes the at least one web server forwarding the web request to the at least one application server. Further, the method includes the at least one application server generating a transaction identifier for the transaction. Moreover, the method includes the backend-computing system processing the transaction. The processing includes generating backend-performance data indexed by the transaction identifier. Additionally, the method includes the at least one application server, via a monitoring agent resident thereon, injecting the transaction identifier into a web response to the web request. Also, the method includes the at least one application server transmitting the web response to the end-user information handling system along a transmission path. The transmission path includes the at least one web server and the at least one end-user information handling system. In addition, the method includes, at a node along the transmission path, passively observing the response and generating end-user experience data therefrom. The end-user experience data is indexed by the transaction identifier.

In one embodiment, an information handling system includes at least one web server and at least one application server. The information handling system is operable to implement a method. The method includes operating at least one distributed software application. The method further includes the at least one web server receiving a web request from an end-user information handling system in connection with the at least one distributed software application. In addition, the method includes the at least one web server forwarding the web request to the at least one application server. Further, the method includes the at least one application server generating a transaction identifier for the transaction. Moreover, the method includes processing the transaction. The processing includes generating backend-performance data indexed by the transaction identifier. Additionally, the method includes the at least one application server, via a monitoring agent resident thereon, injecting the transaction identifier into a web response to the web request. Also, the method includes the at least one application server transmitting the web response to the end-user information handling system along a transmission path. The transmission path includes the at least one web server and the at least one end-user information handling system. In addition, the method includes, at a node along the transmission path, passively observing the response and generating end-user experience data therefrom. The end-user experience data is indexed by the transaction identifier.

In one embodiment, a computer-program product includes a computer-usable medium having computer-readable program code embodied therein. The computer-readable program code is adapted to be executed to implement a method. The method includes, on a backend-computing system, operating at least one distributed software application. The backend-computing system comprises at least one web server and at least one application server. The method further includes the at least one web server receiving a web request from an end-user information handling system in connection with the at least one distributed software application. In addition, the method includes the at least one web server forwarding the web request to the at least one application server. Further, the method includes the at least one application server generating a transaction identifier for the transaction. Moreover, the method includes the backend-computing system processing the transaction. The processing includes generating backend-performance data indexed by the transaction identifier. Additionally, the method includes the at least one application server, via a monitoring agent resident thereon, injecting the transaction identifier into a web response to the web request. Also, the method includes the at least one application server transmitting the web response to the end-user information handling system along a transmission path. The transmission path includes the at least one web server and the at least one end-user information handling system. In addition, the method includes, at a node along the transmission path, passively observing the response and generating end-user experience data therefrom. The end-user experience data is indexed by the transaction identifier.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, backend-performance data and end-user (EU) experience data can be more efficiently correlated via systems and methods described herein. In a typical embodiment, an end-user transaction is initiated by a request such as, for example, an HTTP request, made in connection with a software application. A backend computing system generates an identifier for the transaction such as, for example, a universally unique identifier (UUID), and injects the identifier into a response to the request (e.g., an HTTP response). In a typical embodiment, the identifier can then be used as a basis for indexing and correlating backend-performance data and EU-experience data related to the transaction.

An end-user transaction, as used herein, is initiated by an end-user request such as, for example, a web request, includes subsequent processing of the request by a backend-computing system, and is concluded by a web response from the backend-computing system. Backend-performance data, as used herein, refers to data collected during runtime of a software application such as, for example, a web application, through instrumentation of the software application. EU-experience data, as used herein, refers to data collected through observation of one or more transactions from an EU perspective. For example, in various embodiments, the EU perspective may be a node between a web server and an end-user information handling system, a node between a web server and an application server, or the EU information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
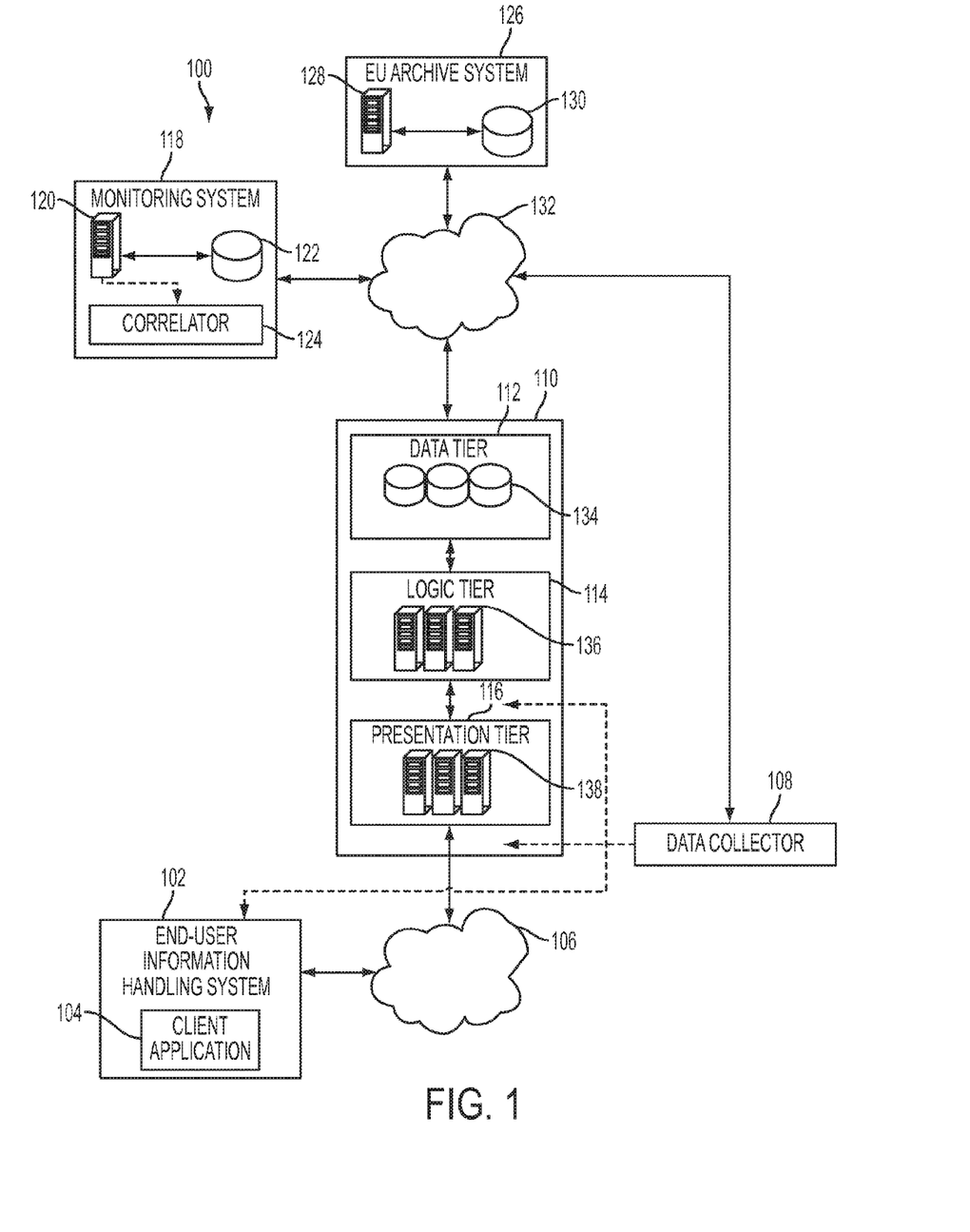
FIG. 1 illustrates a system for correlating backend-performance data and end-user experience data.

FIG. 1 illustrates a system 100 for correlating backend-performance data and EU-experience data. The system 100 includes at least one EU information handling system 102 communicating with a backend-computing system 110 over a network 106. The at least one EU information handling system 102 has a client application 104 such as, for example, a web-browser application, resident and executing thereon. The network 106 may include, for example, a public intranet, a private intranet, and/or the Internet. The system 100 further includes a monitoring system 118 and an EU archive system 126. The backend-computing system 110, the monitoring system 118, and the EU archive system 126 are operable to communicate over a network 132. Like the network 106, the network 132 may be representative, for example, of a public or private intranet or the Internet. In addition, the system 100 includes a data collector 108.

For illustrative purposes, the backend-computing system 110 is shown to utilize a three-tier architecture that includes a presentation tier 116, a logic tier 114, and a data tier 112. The presentation tier 116 includes at least one information server 138 such as, for example, a web server, that serves content to be rendered by the client application 104. The logic tier 114 includes at least one application server 136 that operates a platform based on, for example, Java EE, ASP-.NET, PHP, ColdFusion, or Perl. The data tier 112 includes at least one database 134 that further includes, for example, data sets and a database management system that manages and provides access to the data sets. It should be appreciated that, in various embodiments, the backend-computing system 110 may include any number of tiers. In addition, in various embodiments, the backend-computing system 110 may implement various alternative architectures such as, for example, a model-view-controller architecture. It should also be appreciated that the at least one application server 136 and the at least one information server 138 are shown separately in FIG. 1 only for purposes of illustrating logically-related functionality. In various embodiments, the at least one application server 136 and the at least one information server 138 are combined into a single server that functions as web server and application server.

The backend-computing system 110 executes one or more distributed software applications such as, for example, a web application, from which backend-performance data is collected. In a typical embodiment, the one or more distributed software applications have been instrumented to provide the backend-performance data. Each of the one or more distributed software applications may be, for example, a collection of software components or services that make up an application stack. In various embodiments, the backend-computing system 110 may use an agent resident thereon to collect the backend-performance data.

The backend-performance data can include, for example, metrics related to infrastructure components (virtual or physical) such as, for example, the at least one database 134, the at least one application server 136, and the at least information server 138. The backend-performance data can also include aggregated metrics related to infrastructure tiers such as, for example, the presentation tier 116, the logic tier 114, and the data tier 112. In addition, the backend-performance data can include metrics related to the application stack for each of the one or more distributed software applications. In a typical embodiment, the backend-performance data can trace end-user transactions through a topology of nodes that can include, for example, infrastructure components, infrastructure tiers, and/or application-stack components as described above. Metrics can include, for example, execution time at each tier or by each component. Examples of how backend-performance data can collected and managed is described in detail in U.S. Pat. No. 7,979, 245 and U.S. Pat. No. 8,175,863, each of which is hereby incorporated by reference.

The data collector 108 is a software component that collects the EU-experience data for the at least one EU information handling system 102. In a typical embodiment, the data collector 108 is situated in the system 100 such that the data collector 108 is capable of seeing all network traffic (i.e., all packets exchanged) between the at least one EU information handling system 102 and the backend-computing system 110. In this fashion, the data collector 108 functions as a packet analyzer and is operable to extract the EU-experience data and transmit the EU-experience data to the EU archive system 126. The EU archive system 126 includes at least one server computer 128 and at least one database 130. The EU archive system 126 receives the EU-experience data from the data collector 108 and stores the EU-experience data in the at least one database 130. An example of how EU-experience data can be collected is described in U.S. Pat. No. 7,941,385. U.S. Pat. No. 7,941, 385 is hereby incorporated by reference.

As illustrated, the data collector 108 can reside at various nodes in the system 100. For example, the data collector 108 can reside on the backend-computing system 110 between the presentation tier 116 and the logic tier 114. The data collector 108 can also be resident on the backend-computing system 110 between the presentation tier 116 and the network 106. In addition, in various embodiments, the data collector 108 is representative of client-side scripting that is executed on the at least one EU information handling system 102. In this fashion, the data collector 108 can also be resident on the at least one EU information handling system 102. It should be appreciated that other locations for the data collector 108 such as, for example, within the presentation tier 116, are also contemplated.

The monitoring system 118 includes at least one server computer 120 and at least one database 122. The at least one server computer 120 is operable to execute a correlator 124. The correlator 124 is typically a software component that correlates the EU-experience data maintained by the EU archive system 126 with the backend-performance data maintained by the monitoring system 118. Exemplary operation of the system 100 will be described with respect to FIG. 2.

One of ordinary skill in the art will appreciate that each instance of a computer or computer system as described above may be representative of any number of physical or virtual server computers. Likewise, each instance of a database may be representative of a plurality of databases. In addition, it should be appreciated that, in various embodiments, each instance of a network such as, for example, the network 106 or the network 132, can be viewed as an abstraction of multiple distinct networks. For example, the network 106 and the network 132 can each include one or multiple communications networks such as, for example, public or private intranets, a public switch telephone network (PSTN), a cellular network, the Internet, or the like. In addition, in various embodiments, the network 106 and the network 132 may overlap or refer to a same network.

Figure 2:
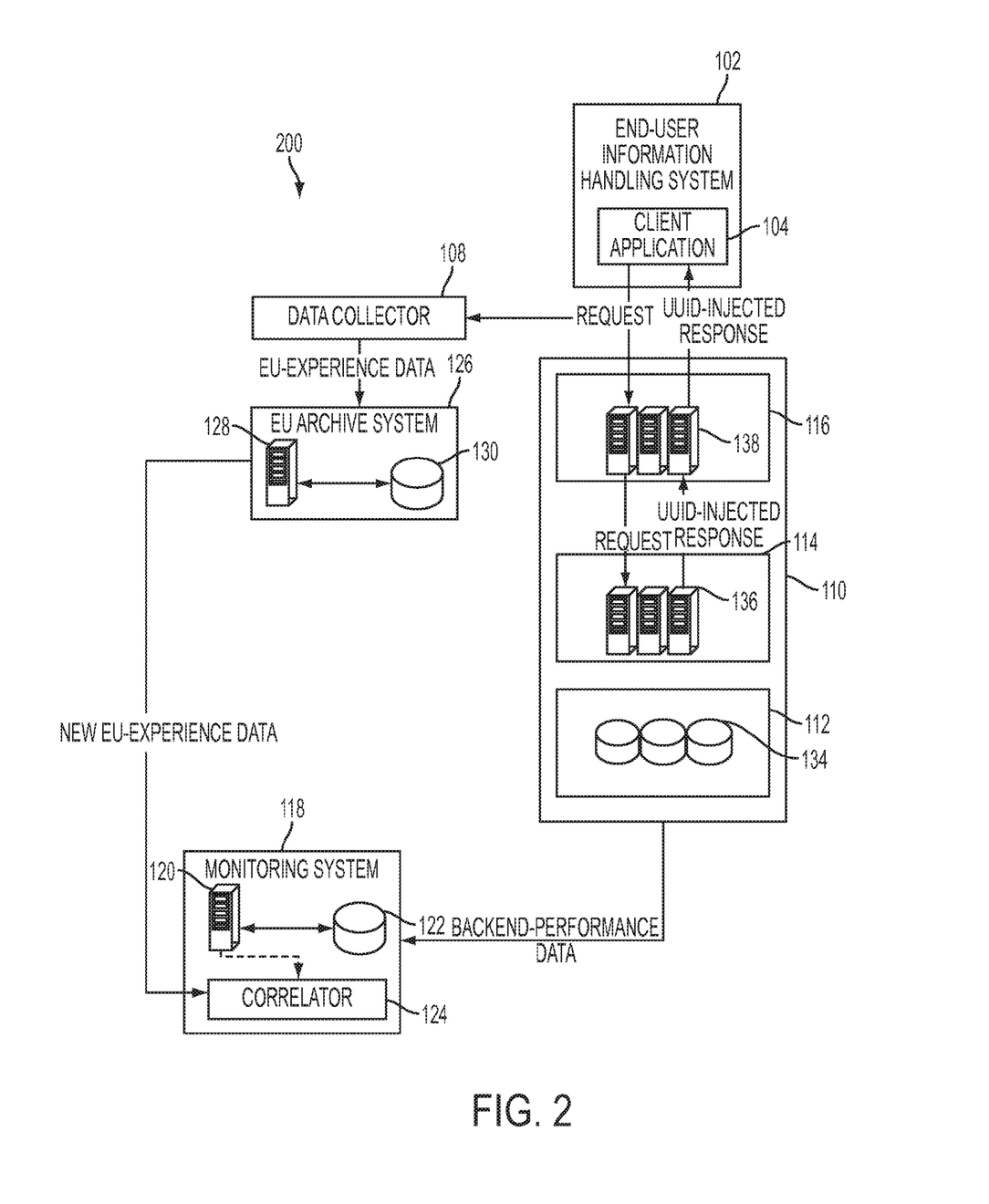
FIG. 2 illustrates an exemplary data flow using the system of FIG. 1.

FIG. 2 illustrates an exemplary data flow 200 using the system 100 of FIG. 1. The EU information handling system 102 initiates a transaction by directing a request such as, for example, an HTTP request, to the at least one information server 138 of the presentation tier 116. The at least information server 138 forwards the request to an appropriate application server, i.e., the at least one application server 136, for handling. The at least one application server 136 generates an identifier (e.g., a UUID) for the transaction. In a typical embodiment, the backend-computing system 110 uses the identifier to identify backend-performance data collected during processing of the transaction, which data is stored by the monitoring system 118 as described above.

A monitoring agent on the at least one application server 136 injects the identifier in a response to the request (i.e., a UUID-injected response), which response is directed to the at least one EU information handling system 102 along a transmission path that includes that at least one information server 138 and the at least one EU information handling system 102. In this fashion, no modification of application code is required to inject the identifier. Rather, the monitoring agent, which is already being utilized for existing instrumentation of the distributed software application, injects the identifier into the response. The response may be a web response such as, for example, an HTTP response. In various embodiments, the identifier can be injected, for example, into a response header for the response. In some embodiments, the identifier may be inserted into a cookie that is sent as part of the response header. Content of the UUID-injected response is rendered on the at least one EU information handling system 102 via the client application 104.

As noted above, the data collector 108 is situated on the system 100 so that the data collector 108 can observe all network traffic exchanged between the backend-computing system 110 and the EU information handling system 102. Therefore, the data collector 108 is effectively a transparent node along the transmission path. The data collector 108 passively observes the UUID-injected response and uses the identifier to identify EU-experience data that is collected.

As part of its functionality, the data collector 108 is operable to collect the content of the response (e.g., web content therein) as part of the EU-experience data. Moreover, the data collector 108 is further operable to collect all content for a web page to which the response corresponds. It should be appreciated that a given web page that is served may involve more than one response and therefore more than one identifier. Also, the at least one information server 138 may insert additional content into the given web page such as, for example, an image, that is not part of the UUID-injected response (i.e., content that has not been tagged by an identifier). In a typical embodiment, for each UUID-injected response, the data collector 108 is operable to capture the content of the UUID-injected response and also any other content within a web page to which the UUID-injected response corresponds. The data collector 108 can associate the other content of the web page with the UUID-injected response's identifier. As described in greater detail below, this feature allows content to be aggregated by identifier (i.e., content included within a UUID-injected response) or at a web-page level for a given identifier (i.e., all content included within a web page with which the given identifier is associated). The collected EU-experience data is transmitted to and stored by the EU archive system 126 as described above.

The correlator 124 is operable to extract EU-experience data not previously obtained by the correlator (i.e., new EU-experience data) from the EU archive system 126. In various embodiments, the correlator 124 may operate on a periodic basis, on-demand, or in real-time. The correlator 124 is operable to correlate the EU-experience data and the backend-performance data that relates to a same transaction (i.e., a same request and response) by cross-referencing identifiers. In this manner, data resulting from instrumentation (the backend-performance data) and the EU-experience data, which is typically collected without instrumentation, can be correlated. The correlated data can be stored in the at least one database 122. In addition, on a periodic basis (e.g., every five minutes) or on demand, the correlator 124 may aggregate the correlated data into one or more high-level transaction categories such as, for example, log-in, search, or checkout. Therefore, problems with particular transaction categories can be readily identified and appropriate alerts generated.

In various embodiments, numerous advantages can be realized as a result of a system such as, for example, the system 100 of FIG. 1. Because of the identifier injection described above, inaccurate correlation of backend-performance data and EU-transaction data is avoided. Rather, at respective points of collection, backend-performance data and EU-transaction data for a same transaction are indexed by a same identifier despite the fact that the backend-performance data and the EU-transaction data are collected at separate physical or logical nodes. In addition, because inaccurate correlation is avoided, aggregation of backend-performance data and EU-experience data for a same transaction or group of transactions is reliable. For example, for a worst-performing group of transactions as measured by response time (i.e., EU-experience data), corresponding backend-performance data can be accurately cross-referenced by identifier. Transaction paths, execution-time break down by infrastructure component and/or application-stack component, and other backend-performance data can be accessed for purposes of conducting a root-cause analysis and/or generating appropriate alerts.

In various embodiments, the identifier injection also supports additional features. As noted above, the EU-experience data can include the content of a UUID-injected response as well as all other content of a web page to which the UUID-injected response corresponds. As a result, the content relating to each transaction can be accessed by identifier. Also, correlated data as described above can be aggregated by transactions involving specific content (e.g., particular words, a title, images, etc.). In this fashion, transactions can be aggregated by content without any knowledge, for example, of a given application's internal data structures or web addresses. In various embodiments, grouping transactions by content as described above can be used to support replay of a particular EU's session. In various other embodiments, session replay can be further supported by grouping content based on, for example, a session ID, time stamp, and the like. In addition to aggregation by content, correlated data can be aggregated at a web-page level by aggregating each identifier associated with a given web page.

Figure 3:
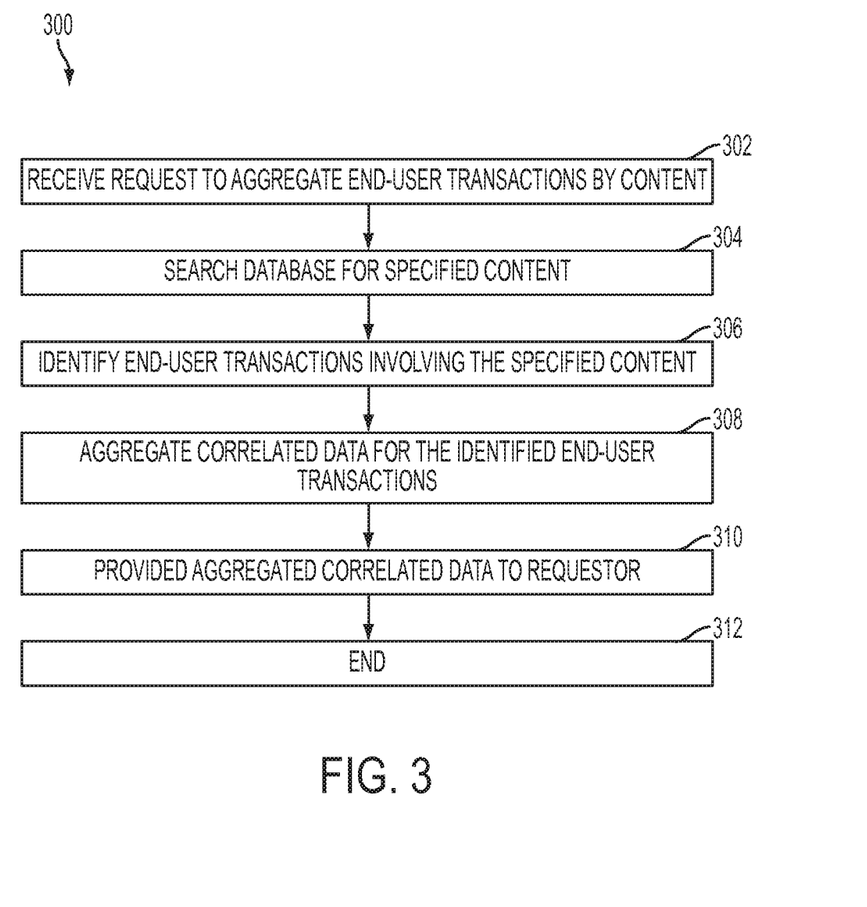
FIG. 3 illustrates a process for aggregating end-user transactions by content.

FIG. 3 illustrates a process 300 for aggregating EU transactions by content. The process 300 may be executed by a monitoring system such as, for example, the monitoring system 118 of FIG. 1. The process 300 begins at step 302. At step 302, the monitoring system receives a request to aggregate EU transactions by content. In a typical embodiment, the request specifies content such as, for example, text, an image, audio, and/or video. A requestor may be an administrator or other user accessing the monitoring system via an interface. The interface may be provided over a network such as, for example, the network 132 of FIG. 1. From step 302, the process 300 proceeds to step 304.

At step 304, the monitoring system searches a database such as, for example, the at least one database 122 of FIG. 1, for each instance of the specified content. In a typical embodiment, the database stores correlated data as described above with respect to FIGS. 1-2. From step 304, the process 300 proceeds to step 306. At step 306, based on the search, the monitoring system identifies by transaction identifier any end-user transactions involving the specified content. From step 306, the process 300 proceeds to step 308. At step 308, the monitoring system aggregates correlated data for the identified end-user transactions. From step 308, the process 300 proceeds to step 310. At step 310, the correlated data, as aggregated, is provided to the requestor. From step 310, the process 300 proceeds to step 312. At step 312, the process 300 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a computer system comprising a web server and an application server:
   the web server receiving a web request from an end-user information handling system in connection with a distributed software application;
   the web server forwarding the web request to the application server;
   the application server generating a transaction identifier for a transaction initiated by the web request;
   the application server, via a monitoring agent resident thereon, injecting the transaction identifier into a web response to the web request, the injecting yielding an identifier-injected web response comprising the web response and the transaction identifier;
   the application server transmitting the identifier-injected web response to the end-user information handling system along a transmission path, the transmission path comprising the web server and the end-user information handling system; and
   at a node along the transmission path, passively observing the web response and generating end-user experience data therefrom, the end-user experience data being indexed by the transaction identifier.

2. The method of claim 1, comprising:
   processing the transaction, the processing comprising generating performance data indexed by the transaction identifier;
   storing the end-user experience data by transaction identifier on an end-user archive system; and storing the performance data by transaction identifier on a monitoring system.

3. The method of claim 2, comprising:
correlating the end-user experience data and the performance data by the transaction identifier to yield correlated data; and
storing the correlated data in a database.

4. The method of claim 3, comprising aggregating the correlated data by transaction identifier for a plurality of transactions.

5. The method of claim 3, wherein the end-user experience data comprises content of the web response.

6. The method of claim 5, comprising:
receiving a request to aggregate end-user transactions by specified content;
searching the database for the specified content;
responsive to the searching, identifying by transaction identifier any end-user transactions involving the specified content;
aggregating correlated data for the identified transactions; and
providing the aggregated correlated data to a requestor.

7. The method of claim 5, wherein the end-user experience data comprises all content of a same web page to which the web response corresponds.

8. An information handling system comprising a web server and an application server, wherein the information handling system includes computer hardware operable to implement a method comprising:
the web server receiving a web request from an end-user information handling system in connection with a distributed software application;
the web server forwarding the web request to the application server;
the application server generating a transaction identifier for a transaction initiated by the web request;
the application server, via a monitoring agent resident thereon, injecting the transaction identifier into a web response to the web request, the injecting yielding an identifier-injected web response comprising the web response and the transaction identifier;
the application server transmitting the identifier-injected web response to the end-user information handling system along a transmission path, the transmission path comprising the web server and the end-user information handling system; and
at a node along the transmission path, passively observing the web response and generating end-user experience data therefrom, the end-user experience data being indexed by the transaction identifier.

9. The information handling system of claim 8, the method comprising:
processing the transaction, the processing comprising generating performance data indexed by the transaction identifier;
storing the end-user experience data by transaction identifier on an end-user archive system; and
storing the performance data by transaction identifier on a monitoring system.

10. The information handling system of claim 9, the method comprising:
correlating the end-user experience data and the performance data by the transaction identifier to yield correlated data; and
storing the correlated data in a database.

11. The information handling system of claim 10, the method comprising aggregating the correlated data by transaction identifier for a plurality of transactions.

12. The information handling system of claim 10, wherein the end-user experience data comprises content of the web response.

13. The information handling system of claim 12, the method comprising:
receiving a request to aggregate end-user transactions by specified content;
searching the database for the specified content;
responsive to the searching, identifying by transaction identifier any end-user transactions involving the specified content;
aggregating correlated data for the identified transactions; and
providing the aggregated correlated data to a requestor.

14. The information handling system of claim 11, wherein the end-user experience data comprises all content of a same web page to which the web response corresponds.

15. A computer-program product comprising a non-transitory computer-usable medium having computer-readable program code embodied therein, the computer-readable program code adapted to be executed to implement a method comprising:
on a computer system comprising a web server and an application server, the web server receiving a web request from an end-user information handling system in connection with a distributed software application;
the web server forwarding the web request to the application server;
the application server generating a transaction identifier for a transaction initiated by the web request;
the application server, via a monitoring agent resident thereon, injecting the transaction identifier into a web response to the web request, the injecting yielding an identifier-injected web response comprising the web response and the transaction identifier;
the application server transmitting the identifier-injected web response to the end-user information handling system along a transmission path, the transmission path comprising the web server and the end-user information handling system; and
at a node along the transmission path, passively observing the web response and generating end-user experience data therefrom, the end-user experience data being indexed by the transaction identifier.

16. The computer-program product of claim 15, the method comprising:
processing the transaction, the processing comprising generating performance data indexed by the transaction identifier;
storing the end-user experience data by transaction identifier on an end-user archive system; and
storing the performance data by transaction identifier on a monitoring system.

17. The computer-program product of claim 16, the method comprising:
correlating the end-user experience data and the performance data by the transaction identifier to yield correlated data; and
storing the correlated data in a database.

18. The computer-program product of claim 17, the method comprising aggregating the correlated data by transaction identifier for a plurality of transactions.

19. The computer-program product of claim 17, wherein the end-user experience data comprises content of the web response.

20. The computer-program product of claim 17, the method comprising:
  receiving a request to aggregate end-user transactions by specified content;
  searching the database for the specified content;
  responsive to the searching, identifying by transaction identifier any end-user transactions involving the specified content;
  aggregating correlated data for the identified transactions; and
  providing the aggregated correlated data to a requestor.

* * * * *